April 12, 1938. J. M. KISSELLE Re. 20,693

SHARP FREEZING CONTAINER

Original Filed Oct. 13, 1931 2 Sheets-Sheet 1

INVENTOR.
John M. Kisselle

BY

Barnes & Kisselle

ATTORNEYS

April 12, 1938. J. M. KISSELLE Re. 20,693

SHARP FREEZING CONTAINER

Original Filed Oct. 13, 1931 2 Sheets-Sheet 2

INVENTOR.
John M. Kisselle
BY
Barnes & Kisselle
ATTORNEYS

Reissued Apr. 12, 1938

Re. 20,693

UNITED STATES PATENT OFFICE 20,693

SHARP FREEZING CONTAINER

John M. Kisselle, Detroit, Mich.

Original No. 2,025,290, dated December 24, 1935, Serial No. 568,570, October 13, 1931. Application for reissue November 29, 1937, Serial No. 176,969

23 Claims. (Cl. 62—108.5)

This invention relates to sharp freezing containers, and has to do particularly with that type of container having compartment forming partitions for the forming of ice cubes or blocks.

The object of the present invention is to facilitate the removal of ice blocks or cubes from an ice cube tray, and is in the nature of an improvement over prior art ice cube trays of this type, such as the rubber trays disclosed in Copeman Reissue Patent No. 17,278, and the triangular shaped flexible metal partition disclosed by the Spreen Patent No. 1,688,887, in that ready removal of the ice blocks is obtained by hinging the compartment forming walls of the partition. Instead of relying mainly upon flexibility, distortability, or the particular kind of material used, the essential feature of the present invention contemplates the bodily movement of one partition wall relative to another to facilitate ejection or removal of the ice cubes.

In illustrating the various embodiments of the present invention, I have shown ice cube trays of a single width, but it will be distinctly understood that the hinged partition units may be designed and used in any multiple arrangement desired. In this connection the outside container unit 2 is preferably of metal and of any standard shape.

Figure 1:
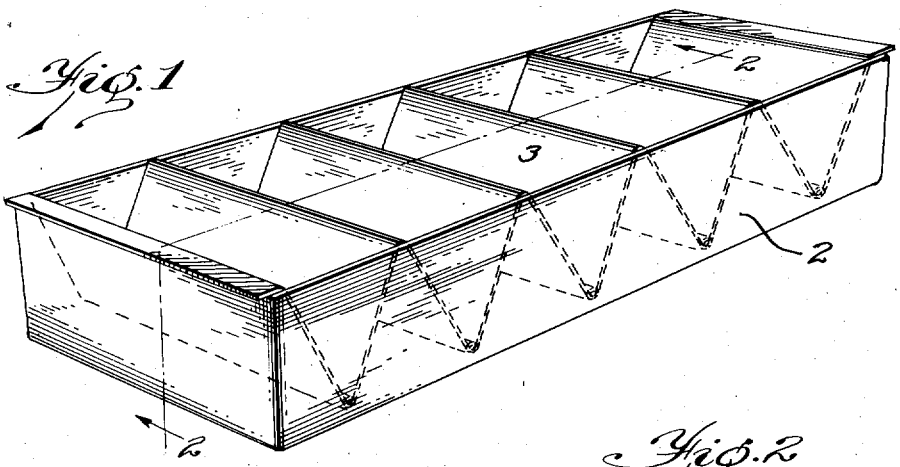
Fig. 1 is a perspective view of a sharp freezing container provided with a compartment forming partition unit embodying the present invention.
Figure 2:
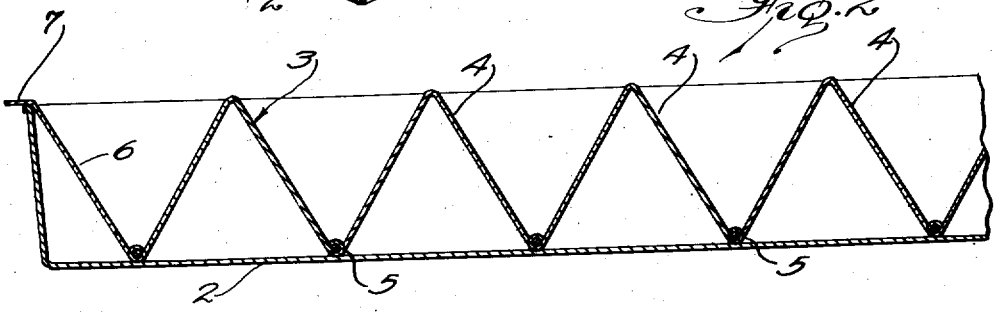
Fig. 2 is a sectional view taken on line 2—2 of Fig. 1 and illustrating the preferred method of hinging the partition walls when arranged to form triangular shaped blocks of ice.
Figure 3:
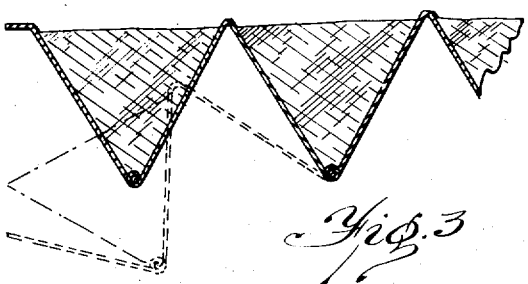
Fig. 3 is a fragmentary view illustrating in dotted lines the relative bodily movement of the compartment walls.

A removable partition unit 3 is adapted to be inserted within the container 2, and as shown in Figs. 1, 2 and 3, this partition unit is made up of a plurality of inverted V-shaped members 4, hinged together at the bottom as at 5, the end members 6 of the partition being preferably provided with suitable extensions 7 to permit grasping of the partition in the removal of the ice cubes. By this arrangement the adjacent hinged walls form the upper compartments for forming the ice blocks. Inasmuch as the walls of each compartment are relatively bodily movable, it will be seen that flexibility ceases to become an important factor as far as ice cube removal is concerned. Material forming the partition unit need not therefore be flexible, but may be made quite rigid and solid so as to obtain relatively great conductivity and provide a permanent partition unit which may be neatly fitted within the container at all times. This is in direct contrast to the standard one piece flexible partition member which upon distortion and flexing loses its original shape after extended use.

The relative bodily movement of the compartment walls will assist materially in the removal of the partition and the frozen blocks of ice from the container. The operator can grasp the portion 7 at one end of the partition and move the same inwardly, placing compressive force upon the block of ice in the first compartment during the first part of the movement and then releasing the block of ice when the partition member 6 is up far enough to permit forward lateral movement. In this manner, one or several ice blocks may be removed from the container without removing the entire partition from the container, or after the entire partition has been removed in any manner, it will be obvious, referring particularly to Fig. 3, that movement of the compartment walls about the hinged members will result in relatively bodily movement of such compartment walls and the release of the ice blocks.

The partition unit may be so formed as to provide a hinged connection 8 at the top of each compartment wall as well as at the bottom. In this case it is desirable to have transverse depressions 9 in the bottom wall of the container so as to locate the bottom hinge members 5 of the partition unit, or if desired the bottom of the container unit may be formed as shown at 10 in dotted lines so as to form a series of spaced triangular shaped portions for positively locating the walls of the partition unit. In the latter case the only ice blocks formed will be those formed by the opened compartments of the partition unit; in other words, the removal of the partition unit in such case would not leave any ice blocks in the container, as would be the case in the unit shown in Figs. 1 and 2.

Figure 5:
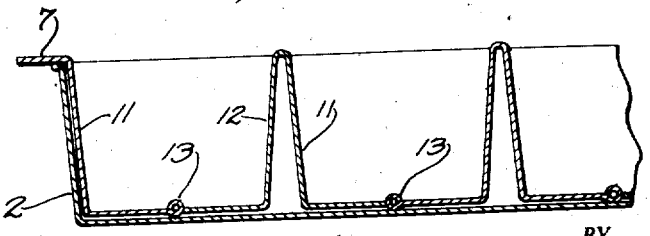
Fig. 5 is a fragmentary sectional view illustrating a modified form of the invention wherein the hinged partition walls are shaped to form ice blocks or cubes of rectangular cross section.

The partition unit instead of being arranged to form triangularly shaped compartments may be arranged as shown in Fig. 5 to form cubical or rectangular shaped compartments. In this case the side walls 11 and 12 of the partition are preferably slightly inwardly and downwardly tapered and are hinged together as at 13. The operation of such a unit as shown in Fig. 5 will be substantially the same as the partition unit shown in Fig. 2.

Figure 6:
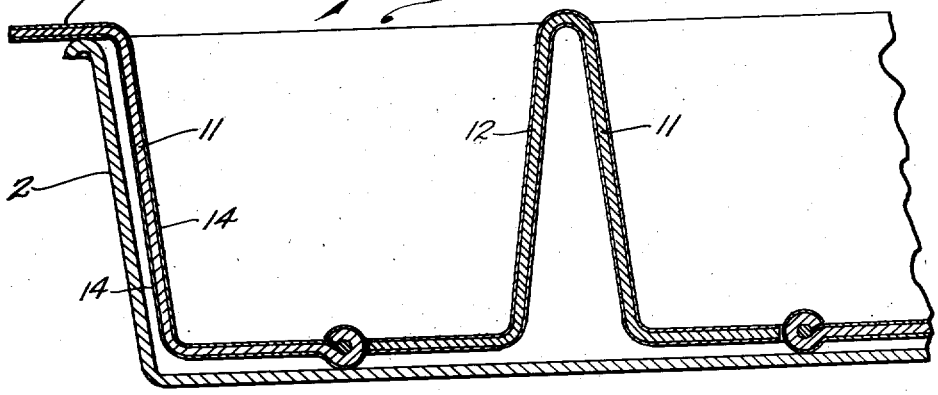
Fig. 6 is a further modification somewhat along the lines shown in Fig. 5 except that the surfaces of the hinged partitions are coated with a material to which ice does not readily adhere.

In Fig. 6 I have shown a somewhat modified form of the structure shown in Fig. 5 wherein the compartment forming walls 11 and 12 are covered, preferably on both sides, with a coating 14 of rubber or any permanent material such as tung oil mixture, as set forth in Hathorne Patent No. 1,932,731. Whatever permanent material is selected, it should be of such a nature that ice will not readily adhere to it. It will be obvious that with hinged compartment members and walls formed of rubber and the like that the removal of the ice blocks will be a comparatively easy matter.

Figure 4:
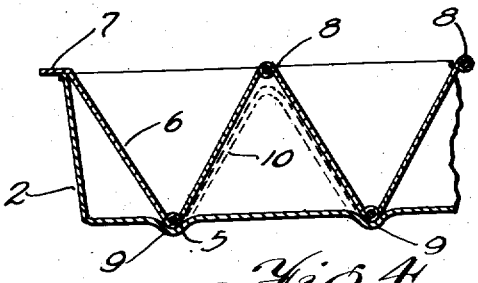
Fig. 4 is a fragmentary sectional view illustrating a slightly modified form of the structure shown in Fig. 2, wherein both the top and bottom apexes of the triangular shaped partition walls are hinged.
Figure 7:
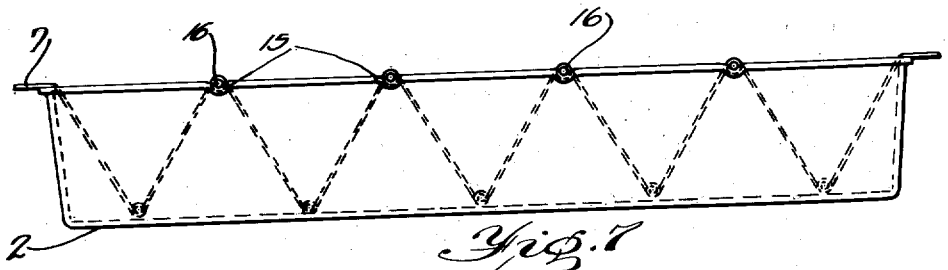
Fig. 7 is a side elevation of a container unit constructed in accordance with the showing in Fig. 4 and illustrating notches in the top of the container wall for positioning the hinged pins.
Figure 8:
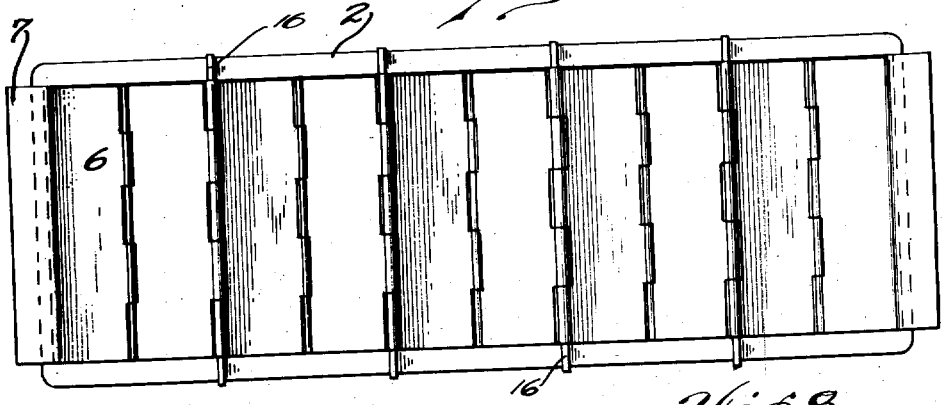
Fig. 8 is a plan view of the structure shown in Fig. 7.
Figure 9:
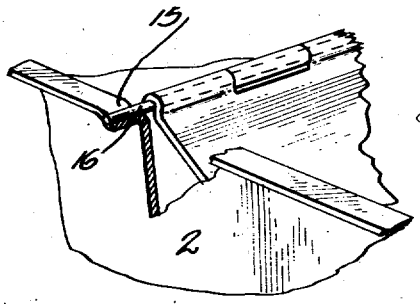
Fig. 9 is a fragmentary perspective view illustrating the manner of locating the hinged partition sections at the top of the container wall.

In Figs. 7, 8 and 9, I have illustrated a modified manner of mounting the partition unit shown in Fig. 4 wherein the bottom of the container is preferably flat but a series of depressions 15 are formed in the top side wall of the container to receive and locate the hinged pins 16 of the partition unit.

It will be understood that the descriptive word "hinged" in the specification and claims is used in its broadest sense and refers merely to a mechanical joint having a hinging or pivotal action.

What I claim is:—

1. A sharp freezing container comprising a removable partition unit having compartment forming walls, said compartments normally extending transversely of the side walls of the container and spaced the length of the container, said walls being hinged to facilitate removal of frozen blocks from said compartments.

2. A sharp freezing container, comprising a removable partition unit adapted to be positioned within the container to form compartments, at least one wall of each compartment being transversely hinged to permit relative bodily movement of the walls of the compartments.

3. A sharp freezing container, comprising a removable partition unit adapted to be positioned within the container to form compartments, all of said partitions extending transversely of the side walls of the container, the end compartment formed by said partition unit having hinged walls to permit bodily movement of the walls of said end compartment.

4. A sharp freezing container comprising a partition shaped to divide the container into compartments, the adjacent walls of each compartment being integral and positioned transversely of the side walls of the container and the walls of each compartment being hinged.

5. A sharp freezing container comprising a partition shaped to divide the container into compartments, the adjacent walls of each compartment being integral and the walls of each compartment being hinged, said adjacent integral walls being positioned at an angle to each other.

6. A sharp freezing container comprising a partition shaped to divide the container into compartments, the adjacent walls of each compartment being integral and the walls of each compartment being hinged, said adjacent integral walls being positioned at an angle to each other to form triangularly shaped compartments.

7. A sharp freezing container, comprising a partition shaped to divide the container into compartments, the adjacent walls of each compartment being integral, said walls being parallel to the end wall of the container, and the bottom wall of the compartments being hinged.

8. A sharp freezing container comprising a partition shaped to divide the container into compartments, the adjacent walls of each compartment being integral and the walls of each compartment being hinged, and spaced depressions formed in said container for positioning the hinged compartments.

9. A sharp freezing container comprising a partition unit within a container, said partition unit being made up of a plurality of units hinged together in zigzag form to divide the container into compartments, a wall of said container being so shaped as to positively locate the individual hinged compartments within the container.

10. A sharp freezing container comprising a partition unit formed to provide inverted V-shaped walls dividing the container into compartments, the side walls of each compartment being hinged together at the bottom and the bottom wall of said container being shaped to cooperate with the walls of said compartment to locate the same in proper spaced relationship within the container.

11. A sharp freezing container comprising a partition unit formed of sections of relatively thin material hinged together and dividing the container into a plurality of compartments, the walls of said partition unit being formed of a material to which ice does not readily adhere.

12. A sharp freezing container comprising a partition unit formed of sections hinged together to form, with the container, a plurality of compartments positioned transversely of side walls of said container, both sides of the walls of said partition unit being formed of a material to which ice does not readily adhere.

13. A sharp freezing container comprising a tray, a partition unit supported by the tray and formed of relatively rigid sections hinged together to form a plurality of compartments, the ends of the compartments being defined by side walls of the tray, the points of hinging being closely adjacent the walls of each compartment, some of the walls being coated with a permanent material to which ice does not readily adhere.

14. A sharp freezing container comprising a partition unit formed of sections of relatively rigid and thin material hinged together and dividing the container into a plurality of compartments for receiving a substance to be frozen, surfaces of the walls of said compartments in contact with said substance to be frozen being formed of a material to which ice does not readily adhere.

15. A sharp freezing container comprising, a receptacle having sides and end walls and a bottom, and means within the receptacle for dividing the substance to be frozen in the receptacle into individual blocks, the dividing means comprising a plurality of partition walls disposed at an angle to each other to form, together with the side walls of the receptacle, compartments, said partition walls being made of relatively thin rigid material and some of said walls being hinged to afford bodily movement of at least one partition wall of each compartment with respect to another partition wall of said compartment, whereby to facilitate the separation of each frozen block from the partition walls comprising its compartment and the ejection or removal of the frozen blocks from their respective compartments.

16. A sharp freezing container comprising, a receptacle having sides and end walls and a bottom, and means within the receptacle for dividing the substance to be frozen in the receptacle into individual blocks, the dividing means comprising a plurality of partition walls disposed at an angle to each other to form, together with the side walls of the receptacle, compartments, said partition walls being made of relatively thin rigid material, some of said walls being hinged and positioned to afford bodily movement of at least one wall of each compartment with respect to another wall of said compartment, whereby to facilitate the separation of each frozen block from the partition walls comprising its compartment and the ejection or removal of the frozen blocks from their respective compartments, and handle means attached to said dividing means for imparting movement to the movable partition walls.

17. A sharp freezing container comprising, a receptacle having sides and end walls and a bottom, and means within the receptacle for dividing the substance to be frozen in the receptacle into individual blocks, the dividing means comprising a plurality of partition walls normally positioned transversely of the side walls of the receptacle to form, together with said side walls, compartments, said partition walls being made of relatively thin rigid material, some of the transverse partition walls being mounted for individual rotatable movement about transverse axes to afford bodily movement of at least one wall of each compartment with respect to another wall of said compartment, whereby to facilitate the separation of each frozen block from the partition walls defining its compartment.

18. A sharp freezing container comprising, a receptacle having sides and end walls and a bottom, and means within the receptacle for dividing the substance to be frozen in the receptacle into individual blocks, the dividing means comprising a plurality of partition walls normally positioned transversely of the side walls of the receptacle to form, together with said side walls, compartments, said partition walls being made of relatively thin rigid material, some of the transverse partition walls being mounted for individual rotatable movement about a transverse axis to afford movement of said transverse walls relative to the side walls whereby to facilitate the separation of each frozen block from the partition walls defining its compartment.

19. A sharp freezing container comprising a receptacle having side and end walls and a bottom, and means within the receptacle for dividing the substance to be frozen into individual blocks, said means comprising a plurality of separate relatively thin rigid partition members extending transversely of the side walls and connected together to permit bodily movement of at least one of the partition members, relative to the side walls of the receptacle, and relative to another portion of the dividing means to separate the blocks from portions of said means and said receptacle, the path of movement of said partition member during said bodily movement being parallel to said side walls.

20. A sharp freezing container comprising a receptacle having side and end walls and a bottom, and means within the receptacle for dividing the substance to be frozen into individual blocks, said means comprising a plurality of separate rigid partition members extending transversely of the side walls and so connected together as to permit bodily movement of at least some of said partition members relative to the side walls of the receptacle to separate the blocks from portions of the grid and the receptacle, said members being at all times substantially perpendicular to said side walls during said bodily movement, and means connected to said dividing means to be moved by the hand to effect bodily movement of one or more partition members.

21. In a freezing apparatus, the combination of a receptacle having side and end walls adapted to receive a substance to be frozen, a partition unit within said receptacle, said partition unit comprising a plurality of walls some of which extend transversely of the side walls of the receptacle for dividing the interior thereof into a plurality of ice blocks, some of said partition walls comprising separate rigid partition members so connected together to permit bodily movement of at least some of the partition walls about transverse axes and relative to the side walls of the receptacle whereby at least one of the partition walls is movable bodily relative to the side wall of the receptacle and simultaneously movable about a transverse axis to exert compressive force against the block and break the same loose from the partition wall and the receptacle.

22. A partition unit for use with and adapted to be inserted in sharp freezing containers for dividing same into compartments, comprising a plurality of separate relatively thin and rigid partition members, certain edges of said members being substantially horizontal in the normal use of said unit, and means connecting the partition members together, said means being so constructed as to permit bodily movement of at least one of said partition members relative to another part of said partition unit and to normally maintain said horizontal edges of said separate partition members in spaced parallel relationship.

23. The structure defined in claim 22 in which the connecting means for the partition members are in substantially the same plane when positioned in a container and in which surfaces of the partition members are treated to form surfaces to which ice does not readily adhere.

JOHN M. KISSELLE.